No. 741,874. PATENTED OCT. 20, 1903.
J. W. BARNES.
MOWING MACHINE.
APPLICATION FILED MAY 26, 1902.
NO MODEL. 2 SHEETS—SHEET 2.
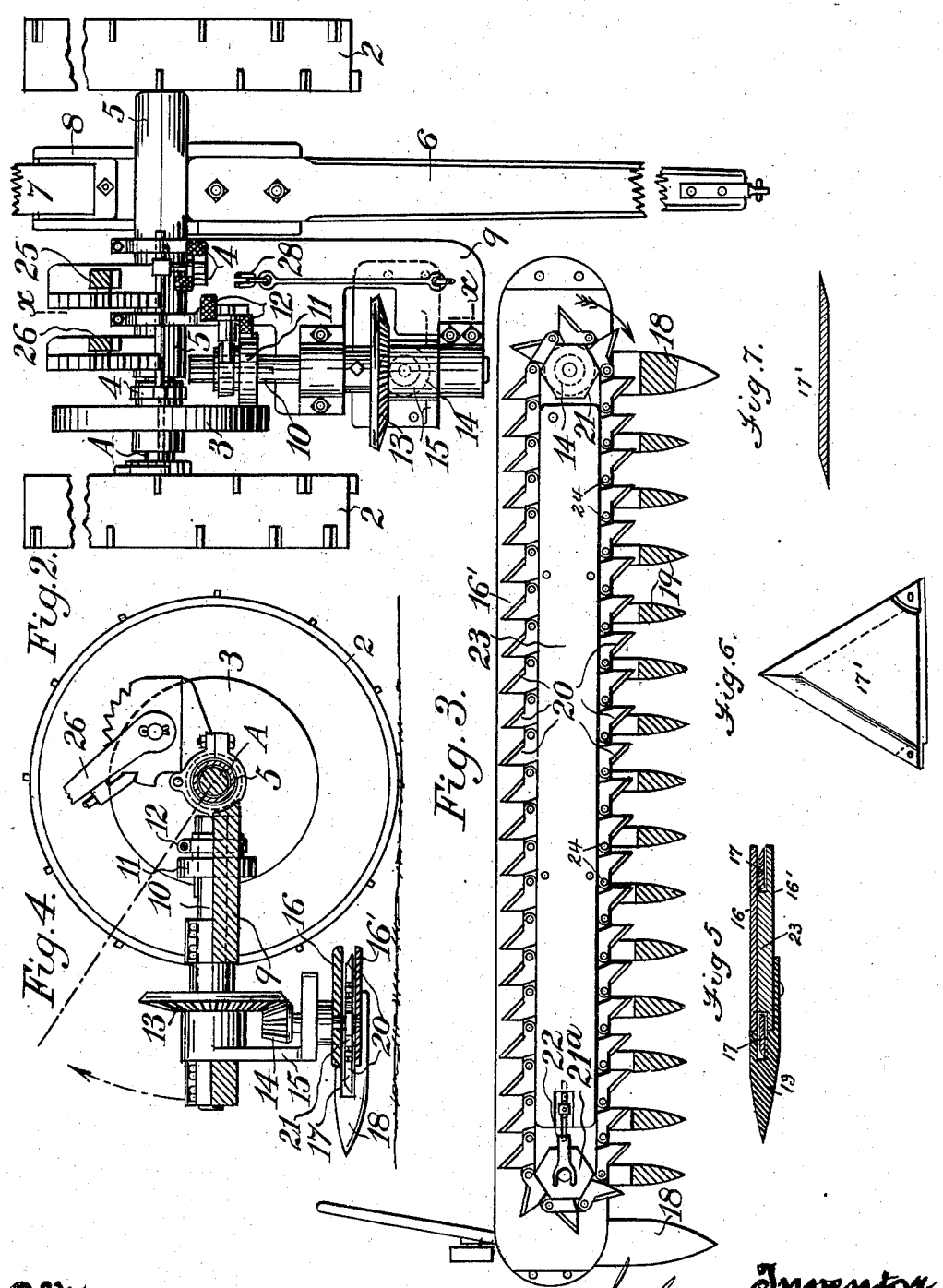

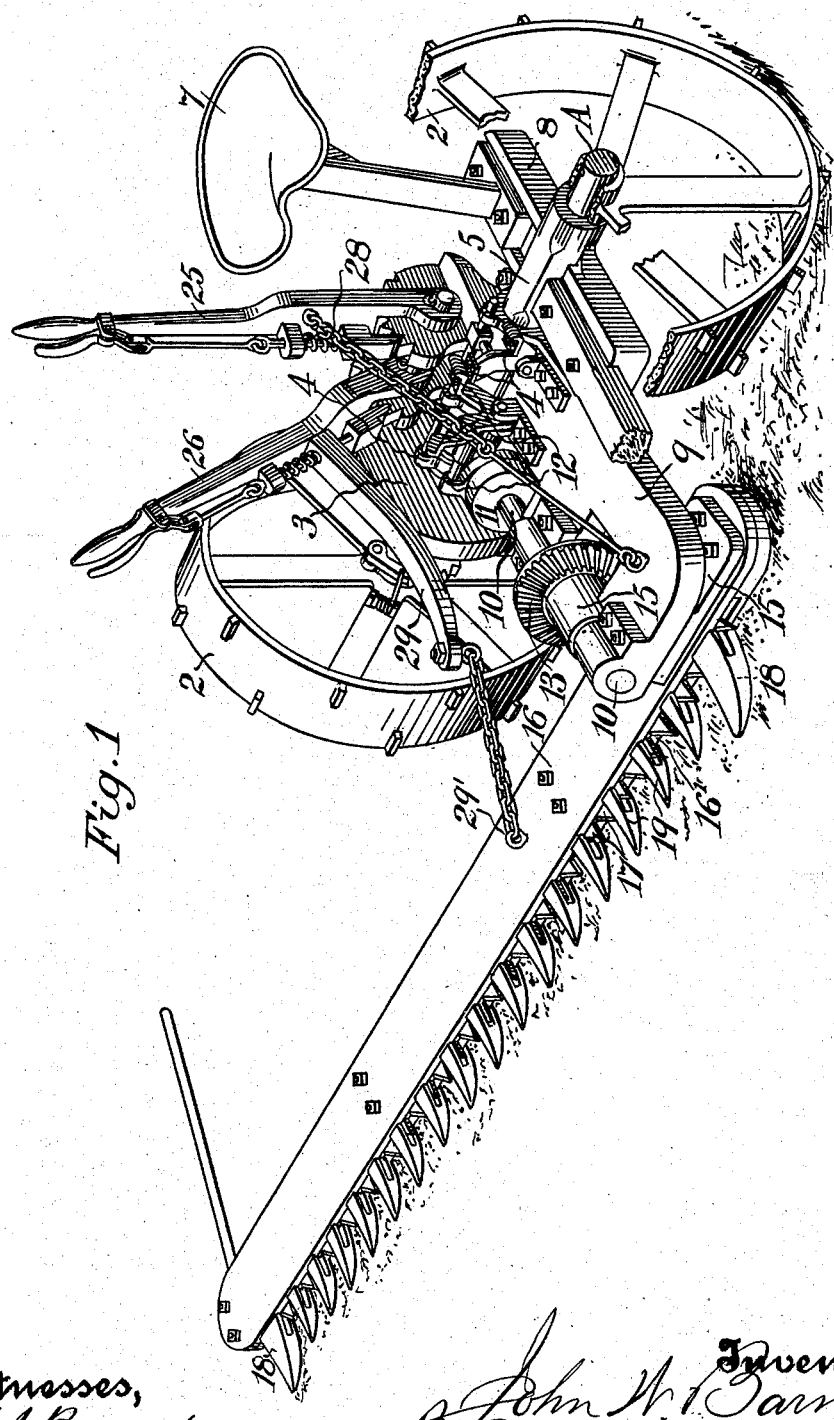

No. 741,874.

Patented October 20, 1903.

UNITED STATES PATENT OFFICE.

JOHN W. BARNES, OF SAN FRANCISCO, CALIFORNIA.

MOWING-MACHINE.

SPECIFICATION forming part of Letters Patent No. 741,874, dated October 20, 1903.

Application filed May 26, 1902. Serial No. 109,002. (No model.)

*To all whom it may concern:*

Be it known that I, JOHN W. BARNES, a citizen of the United States, residing in the city and county of San Francisco, State of California, have invented an Improvement in Mowing-Machines; and I hereby declare the following to be a full, clear, and exact description of the same.

My invention relates to improvements in mowing-machines employing an endless cutter in contradistinction to those in which a reciprocating cutter-bar is used.

Its object is to provide, among other things, a simple, efficient, durable, and positively-operated device in which the speed of the cutter may be regulated according to the character of the grain and the rate of travel of the team.

The invention consists of the parts and the constructions and combinations of parts hereinafter described and claimed.

Figure 1 is a perspective view of my invention. Fig. 2 is a plan of the same, the cutter and guard-plate being removed. Fig. 3 is a plan of the cutter, the upper guard-plate being removed. Fig. 4 is a longitudinal section on the line $x\ x$, Fig. 2. Fig. 5 is a cross-sectional view of the cutting mechanism. Fig. 6 is a plan view of a modified cutter-section. Fig. 7 is a sectional view of said cutter-section.

A represents the main axle of my machine, upon which the wheels 2 are turnable in such a manner that the axle will rotate in unison with the wheels when the machine moves forward, but will remain stationary whenever the wheels are turned in a reverse direction. A disk 3 is turnable with and slidable on the axle. Its sliding movement may be controlled by means of a lever mechanism 4. The axle is freely turnable in a sleeve 5, and the tongue 6 and seat 7 are fixed to the sleeve. When in operation, the only weight upon the team, as will be seen, is that of the tongue, which in great measure is counterbalanced by the seat and the operator.

The seat is adjustable forward and backward in the guides 8 on the platform, so that the load may be properly counterbalanced.

The bracket 9, which supports the cutting mechanism and the operating means therefor, is pivoted to the sleeve so as to be freely movable vertically. A short shaft 10 is journaled in the bracket, and a friction-roller 11, adapted to engage the flat surface of the disk, is turnable with the shaft and is slidable radially of the disk in a feather on the shaft.

The lever 4 is for the purpose of throwing the disk in and out of engagement with the roller. By shifting the roller by means of the clutch-lever 12 so that the roller engages nearer the center or nearer the periphery of the disk the shaft is driven at a respectively slower or more accelerated speed, as is obvious.

The shaft 10 carries a bevel-gear 13, which meshes a similar gear 14, having its shaft journaled in a hanger 15, which latter is supported on and is turnable about the shaft 10. The hanger carries the cutting mechanism, which comprises the upper and lower guard-plates 16 16', between which the endless cutter 17 is sheathed and movable. The ends of the guard-plates are supported on the usual shoes 18, and the lower plate 16' carries the guards or fingers 19.

The cutter consists of the separable links or sections 20. The sections are here shown as of right-angled triangular form, with the hypotenuse portion beveled as a cutting edge and the base or back of each section adapted to fit the sides of the hexagonal wheels 21 21$^a$, disposed at either end of the guard-bars and around which the cutter travels. The wheel 21 at the inner end of the plates is fixed to the shaft of gear 14, so as to be operated through its connections with the main axle to drive the endless cutter. The wheel 21$^a$ is adjustable longitudinally of the guard-plates, so that any slack may be taken up in the cutter-chain by means of a suitable tension device 22. Each knife-section is separately removable from the chain. Their adjacent ends are perforated and correspondingly reduced in thickness, as shown in Fig. 6, so that one section end will lie flat upon a succeeding section end and the surfaces of the sections will lie in the same plane. The lower guard-plate 16' is formed with a top central panel portion 23, as shown in Fig. 5, which is raised from the margin on which the cutter runs approximately the thickness of a knife-section. The wheels 21 21ª turn in the same plane with the panel, and when the top plate 16 is bolted down tight upon the panel the wheels and cutter will still be freely movable between the two plates. The sections are simply held together by short pins 24, dropped into the perforations in the overlapped ends of the sections. The lower guard-plate prevents the pins dropping through, and the upper guard-plate prevents their being accidentally withdrawn, so that as long as the two plates are bolted together the sections will be held together. By removing the upper plate it is but the work of an instant to remove any section and replace it with a new or sharpened one. If desired, the sections 17' could each be provided with two inclined beveled cutting edges, as shown in Figs. 6 and 7, and when the cutter became dull by continuous running in one direction the upper plate could be removed and the cutter turned over, so as to present the other cutting edges to the fingers. The front edge of the panel is near enough to the front of the plates to cause the knives to project sufficiently to coöperate with the fingers in the proper manner, while the width of the guard-plates and the distance of the rear edge of the panel from the back of the plates are such that the knives are entirely sheathed during the return movement of the cutter. Two rack-levers 25 and 26 are fixed to the axle-sleeve 5 within convenient reach of the operator. The first connects by a chain 28 with the bracket to lift the latter if at any time it is desired to elevate the inner end of the cutting mechanism or support the latter independently of the ground. The second lever carries an arm 29, which connects by a chain with the guard-plates, as at 29', whereby the cutting mechanism may be lifted and turned about the shaft 10 as a fulcrum. The sickle can be inclined at any angle. It is adapted to be lifted into and held in a vertical position, whereupon it is admirably suited for trimming hedges. The cutter will continue to operate so long as the disk and friction-roller 11 are in engagement.

By shifting the roller radially of the disk the cutter can be operated at any desired speed relative to the rate of travel of the team or the character of the grain being cut.

With mowing-machines ordinarily the cutter-bar acts more or less rapidly, according as to whether the team travels faster or slower. It requires constant urging of the team to a speed at which the cutter will act properly or pulling upon the team to hold them back, so as not to drive the bar at such a rate as to break the machine. With my device, on the other hand, by means of the lever 12 the speed of the cutter can be regulated entirely independently of how fast the team travels.

If the team is slow-moving, the roller is moved nearer to the periphery of the disk, whereupon the cutter moves at accelerated speed in reference to the speed of the axle. If the machine is moved more rapidly, the roller is shifted nearer the center of the disk, and so the full benefit of more rapid traction may be fully utilized. By a simple movement of the lever 4 the disk is thrown out of engagement with the roller, whereupon the cutter ceases to operate.

When the cutter is not operating, the cutter mechanism may be laid across the tongue in the usual manner.

Having thus described my invention, what I claim, and desire to secure by Letters Patent, is—

1. In a mowing-machine, the combination of bearing-wheels; an axle; a sleeve on said axle; a tongue and a seat-support also fixed to the sleeve; a bracket pivoted to the sleeve so as to be freely movable vertically and extending parallel with the tongue; a short shaft journaled in the bracket; frictional gearing between the shaft and main axle, one member of said gearing being on the axle and the other on the shaft, and means for moving one gear relative to the other for obtaining variable speed; a cutting mechanism extending at right angles to the bracket and having one end pivotally hung thereto; means whereby the bracket may be raised about the axle, and means whereby the cutting mechanism may be raised and lowered.

2. In a mowing-machine, the combination of bearing-wheels; an axle; a sleeve on the axle; a tongue and seat-support also fixed to the sleeve; a bracket pivoted to the sleeve so as to be freely movable vertically, and extending parallel with the tongue; a short shaft journaled in the bracket; gearing between the shaft and main axle and including a member on the axle and a companion member on the short shaft; means for moving one gear relative to the other for obtaining variable speed; a cutting mechanism supported by and extending at right angles to the bracket and means for raising and lowering the bracket about its pivotal axis including a rack-lever and a connection extending therefrom to the forward end of the bracket.

3. In a mowing-machine, the combination of bearing-wheels; an axle; a sleeve thereon; a tongue and seat-support also fixed to the sleeve; a bracket extending longitudinally toward the front of the machine and parallel with the tongue; a short shaft parallel with the bracket and journaled therein; gearing between the shaft and main axle and including a member on the axle and a companion member on the shaft; means for moving one gear relative to the other, for obtaining variable speed; a cutting apparatus extending across the front of the machine and having one end hingedly connected to the outer end of the bracket; means for raising and lowering the bracket; and means including a rack-lever, the forwardly-extending arm 29 and a connection therefrom to the cutting apparatus at a point one side of the hinged connection thereof, for moving the cutting apparatus about said connection.

In witness whereof I have hereunto set my hand.

JOHN W. BARNES.

Witnesses:
A. L. JEFFERIS,
EDWIN W. WOODWARD.